May 17, 1938.  J. B. EISEN ET AL  2,117,711
CROWN CAP SPOTTING MACHINE
Filed May 10, 1937   4 Sheets-Sheet 1
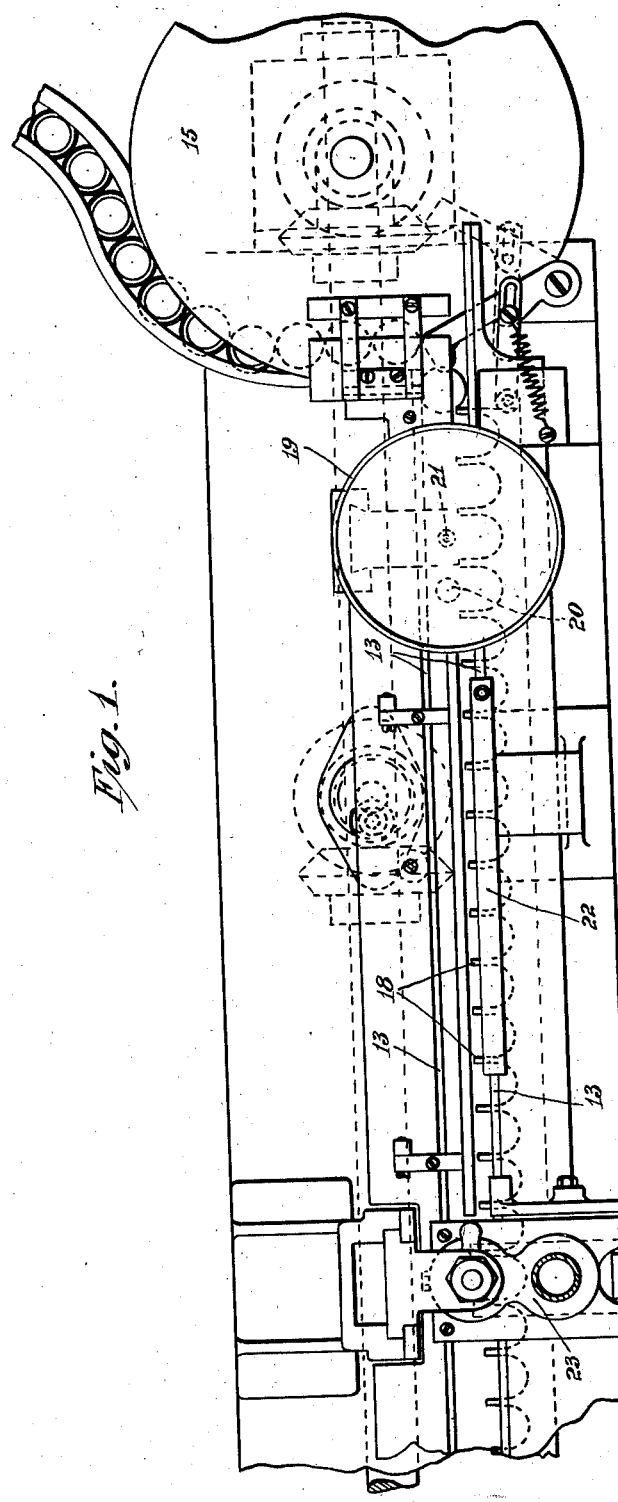
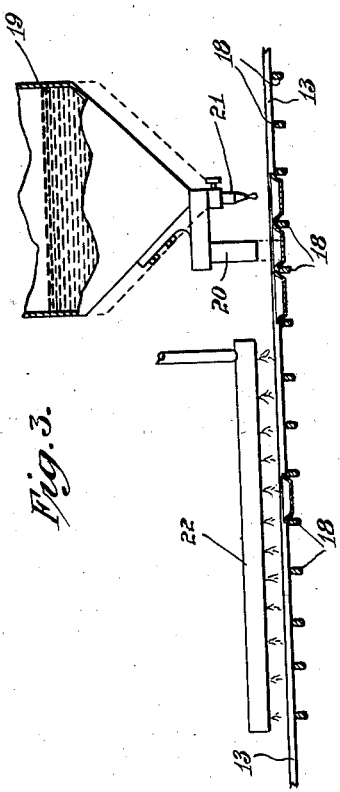

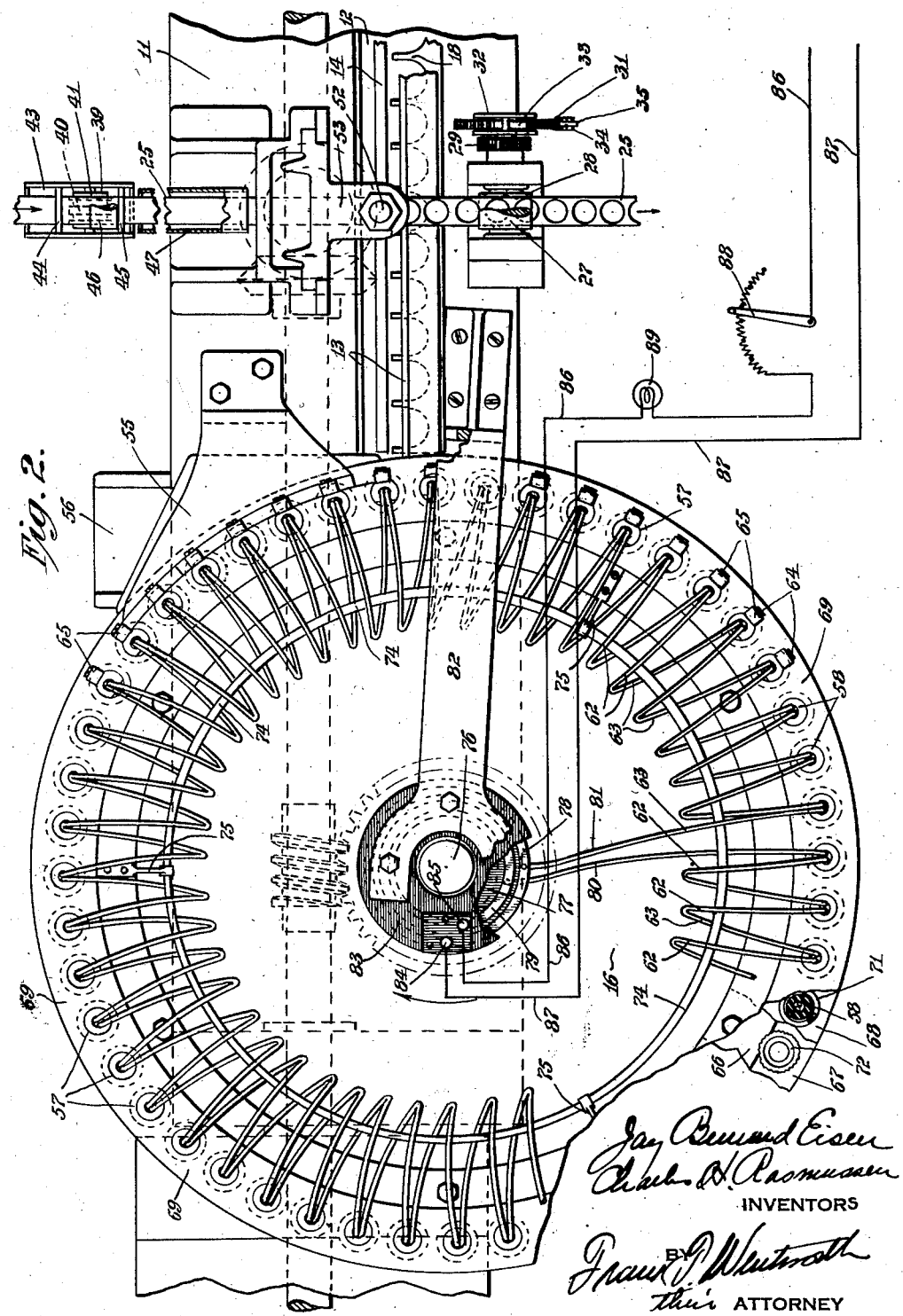

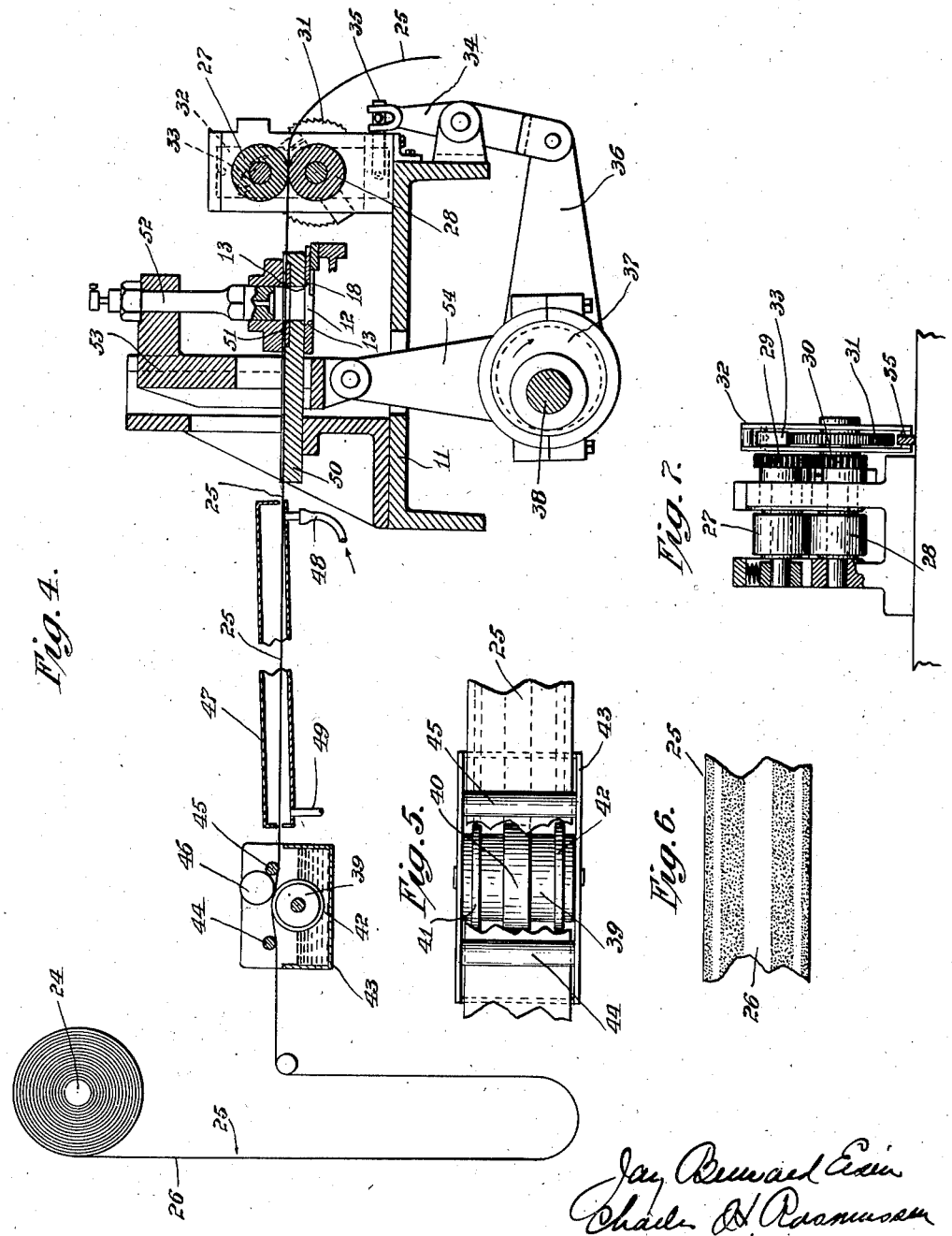

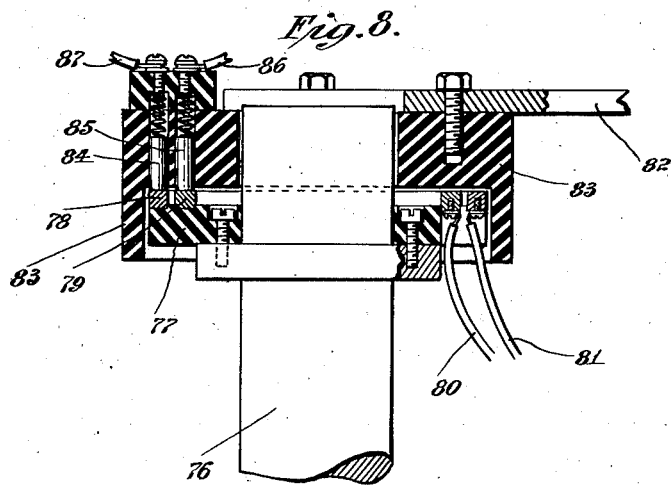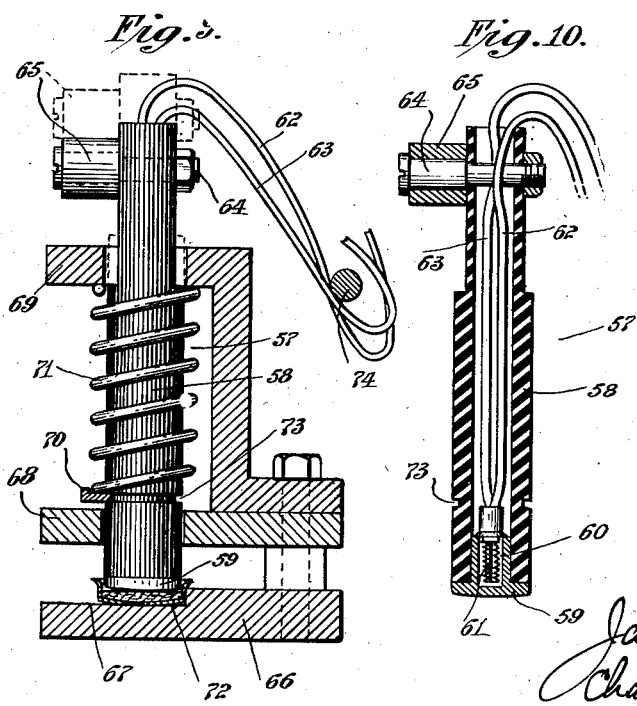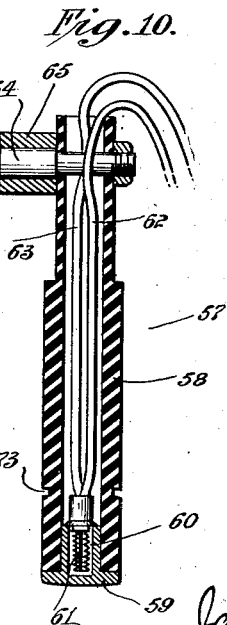

Patented May 17, 1938

2,117,711

UNITED STATES PATENT OFFICE 2,117,711

CROWN CAP SPOTTING MACHINE

Jay Bernard Eisen, Yonkers, and Charles H. Rasmussen, Brooklyn, N. Y., assignors to Ferdinand Gutmann & Co., Brooklyn, N. Y., a corporation of New York Application May 10, 1937, Serial No. 141,872

17 Claims. (Cl. 113—80)

The invention relates to crown cap spotting machines, and more particularly to a machine in which the center spot discs are cut by means of a cold cutting die from a strip of facing material coated with an adhesive which sets under heat, and pressed upon the cushion disc of crowns without subjecting said cushion or said center spot disc to heat prior to or during the application of the disc thereto.

Prior to our invention, two types of spotting machines were in general use. In one of these machines, center spot discs were cut by a heated cutting die from a strip of facing material having associated therewith a strip of heat fusible adhesive such as gutta-percha. In this machine, the disc of facing material and gutta-percha was subjected to heat and pressure simultaneously with its application to the cushion disc of a crown and while the disc was cold or at normal factory temperatures.

The other machine commonly used contained a heater raising the temperature of the cork disc immediately prior to the application of the center spot thereto, this center spot being cut from a strip of facing material having one face thereof coated with a heat fusible adhesive.

While in the machine first above referred to the adhesive was melted and made tacky by the transmission of heat thereto through the material of the center spot, in the second machine, said adhesive was fused and made tacky by heat transmitted to the adhesive by the heated cushion disc upon contact of the adhesive therewith.

In both machines, after the center spot had been initially applied to the cushion disc, the crown with the disc adhering to the cushion disc was conveyed to a collecting head or drum having a plurality of cold spring pressed plungers operative upon succeeding crowns to subject them to a continuing cold pressure for a time interval sufficient to allow the adhesive to set. Heat fusible adhesives set as a result of the extraction of heat therefrom.

In addition to the two types of machines above referred to, it has been proposed to apply center spots to crowns by the use of a machine embodying therein a dropper applying a viscous albumen adhesive to the central portion of the cushion disc and depositing a disc of center spot material, uncoated with adhesive, upon the adhesive thus deposited upon the cushion disc, and finally subjecting the spot to a continuing heat and pressure until the albumen coagulated.

In still another proposed machine, a strip of facing material coated with a water soluble adhesive was used, and water was deposited in a restricted area upon the cushion disc. The center spot, while the adhesive was still dry, was applied to the moistened portion of the cushion disc, the assembly subsequently being subjected to a continuing pressure until the adhesive set as a result of the evaporation of the water.

Neither of the machines immediately above referred to was capable of successful commercial use, all center spot machines commercially used having been of the type using heat applied through the cutting die or directly to the cushion disc in the manner above referred to.

With the above conditions in mind, we have developed the machine of the present application which is adapted for use in the production of center spot crowns in which the center spots are cut from a strip of facing material having one surface thereof coated with an adhesive which will become tacky when moisture is applied thereto, so that a center spot cut therefrom will adhere with sufficient tenacity to a cold cushion disc to permit the conveyance of the assembly to a collecting head or drum wherein the center spot will not only be subjected to a continuing pressure but to a continuing elevated temperature for a time interval sufficient to cause the adhesive to undergo chemical reactions causing it to set, the adhesive used containing as a constituent a material which sets only under heat, as well as constituents which become tacky when moistened.

The construction of the machine is such as to permit the control of the temperature to which the adhesive is subjected while in the collecting head or drum, thus adapting the machine for use with varying temperature conditions during different seasons of the year and avoiding the development of temperatures sufficiently high to cause deterioration of the material of the cushion disc.

In a machine embodying the invention, it is essential to moisten the dry adhesive with which the strip of facing material is coated immediately prior to the cutting of the center spot discs therefrom, and to control the volume of the moistening fluid applied to the strip material and ensure its diffusion throughout the coated face thereof, since excess moisture is liable to result in side slipping of the facing disc as it is being applied to the cushion disc by pressure from the cutting plunger die.

Machines used in the production of crowns must operate at high speeds, and when producing center spot crowns, the crowns must be intermittently advanced through the machine so as to afford a proper time interval for the cutting of discs from the strip of facing material and their application to the cushion discs while the crowns are at rest. The interval of movement of the crown allows time for the feeding of the strip material from which the center spots are cut, so that this strip is at rest during the cutting of a disc therefrom.

In the machine of the invention, the crowns are fed through the machine at the rate of about four per second, the time within which the coated strip is fed in relation to the cutting die and within which a center spot disc is cut from this strip and applied to the cushion disc thus being limited as to each operation, to a fraction of one-quarter of a second. The time interval required to set the adhesive will vary from seven to ten seconds. By accumulating the assembled crowns in a collecting drum which will receive between thirty and forty crowns, and subjecting the center spot to pressure while it is in this collecting drum, each crown may be held under pressure and subjected to heat for a time interval sufficient to ensure the setting of the adhesive. Each crown is subjected to a continuing pressure, uniform as to all crowns while in the collecting head or drum, and a machine embodying our invention is so constructed, notwithstanding the rotation of this head or drum, that each crown is subjected to an unvarying temperature while in said head or drum. This temperature may be regulated and controlled to ensure the application of heat at the desired temperature to the spot during the entire interval that the crown is in this collecting head or drum.

To secure the above result, we use a special form of plunger containing an electrical resistance heating element carried by a metallic tip of each presser plunger, this tip having a face so shaped as to conform to the contour assumed by the cushion disc when subjected to pressure by the plunger. By locating the heating element closely adjacent the point of contact of the plunger with the spot, loss of heat through radiation is prevented and a more effective control of the temperature to which the spot is subjected is assured.

Provision is made in the plunger mechanism to allow not only for the turning of the collecting head or drum, but also for the vertically reciprocatory movement of the plungers incidental to the feeding and ejection of the crowns to and from the head or drum.

The construction of the plungers is also such as to prevent short circuiting of the electric current supplying the heating elements and to guard against the conduction of heat from the plungers to other parts of the head or drum.

The construction of the heated plunger mechanisms of the collecting head or drum is not only such as to secure the results above referred to, but permits the use of a low potential current as to each plunger, the control of the temperature of all of the plungers from a single source, and the elimination of all possibility of the heating element of any plunger becoming inoperative without the machine operator being immediately informed of the fact.

In a machine embodying the invention, the heat for setting the adhesive is applied to the adhesive through the center spot, so that at no stage in the operation of the machine when producing center spot crowns is the portion of the cushion disc, relied upon to effect the sealing of the mouth of a container, subjected to heat sufficient to impair the elasticity of the effective part of the cushion disc.

The construction of the machine is such that by selectively making the different mechanisms thereof operative or inoperative, it may be used for assembling crown caps without center spots, or it may be used to apply center spot caps to previously assembled crowns, or it may be used to assemble ordinary crowns and apply center spots to the cushion discs thereof by a continuing operation of the machine.

The machine is what may be termed a "universal machine" in the respects that it may be operated in the different manners above referred to, thus permitting the production of either plain or center spot crowns in a plant with a smaller machine equipment, occupying less factory floor space, than would otherwise be necessary to produce the same variety of crowns by other machines.

The invention consists in the novel features of construction and combination of parts hereinafter set forth and described, and more particularly pointed out in the claims hereto appended.

Referring to the drawings,

Fig. 1 is plan view, partly broken away, of one end of the machine;

Fig. 2 is a similar view of the opposite end of the machine showing the spot applying mechanism and the collecting drum;

Fig. 3 is a diagrammatic view of the adhesive applying and drying mechanism used only when assembling cushion discs in metal shells;

Fig. 4 is a cross sectional view of the parts appurtenant to the strip feeding and spot applying mechanisms;

Fig. 5 is a detail plan view of the strip moistening roller mechanism with the presser roller removed therefrom;

Fig. 6 is a bottom plan view of a short section of facing strip after it has been dampened;

Fig. 7 is a detail view of the strip feeding rollers and the actuating mechanism therefor;

Fig. 8 is a detail view of the collector ring head and the commutator mechanism co-operating therewith;

Fig. 9 is a vertical section of one of the presser plungers of the collecting head or drum, showing in dotted lines the movement of the head; and Fig. 10 is a vertical section of the plunger shown in Fig. 9.

Like numerals refer to like parts throughout the several views.

In the embodiment of the invention shown in the drawings, the mechanisms feeding crowns in the machine and the cork disc feeding mechanism, the rotary collecting head or drum and the mechanisms actuating these parts are substantially identical with the corresponding mechanisms shown in the patent to Clark, 1,134,031 of March 30th, 1915, the structure of said patent being an assembling machine for caps of the crown type.

In the machine of the invention, a fluid adhesive is used for securing the cushion disc in the metal shell in lieu of the paper collet and strip feeding mechanism of said patent. In adapting this type of machine to the application of center spots for the practice of our invention, the various mechanisms, however, are re-arranged, the mechanisms of the collecting head or drum are modified, and a strip feeding and conditioning mechanism and a cutting die associated therewith is positioned between the cork feeding mechanism and the collecting head or drum and closely adjacent the latter.

Referring to the drawings, the bed plate 11 of the machine is substantially the same as shown in the Clark patent, having a longitudinally extending slot 12 therein having supporting guides 13 adapted to be engaged by the fluted skirt of the metal shells of the crowns. An overhead track 14 may be used to prevent vertical displacement of the metal shells in their progress along said guides 13, this overhead track being interrupted adjacent the adhesive applying, the cork feeding and the spot applying mechanisms.

At one end of the bed plate 11 is a metal shell delivery mechanism 15 of the type shown in said patent, and at the other end of said bed plate is a collecting head or drum 16 carrying a plurality of presser plungers. Below the bed plate 11 is a forked feed rack 18 having a four-way movement so as to intermittently advance the metal shells from the point of delivery of such shells to the slot 12 by the feeding mechanism 15 in relation to the various mechanisms along the bed plate 11, and deliver them to the collecting head or drum 16. This mechanism is the same as shown in said Clark patent.

While, in the drawings, the general arrangement and construction of parts and the actuating mechanisms therefor are as shown in said Clark patent, other types of crown assembling machines may be modified to include therein the spot applying and strip feeding mechanism and the novel characteristics of the collecting head or drum as shown in the accompanying drawings so as to adapt such machines to the production of center spot crowns.

The detailed construction and relation of parts as shown in the drawings are such as to adapt the machine to the assembly of the cushion discs in the metal shells and the application of the center spots to said cushion discs upon a single passage of the metal shells through the machine, the heat and pressure to which the crowns are subjected while in the collecting head or drum serving to form the final bond between the cushion disc and the metal shell, as well as between the center spot and the cushion disc.

If it be desired to use the machine for the production of plain or unspotted crowns, the head carrying the center spot die mechanism may be removed from the machine and the strip feeding mechanism be made inoperative. If it be desired to use the machine for the production of center spot crowns by applying center spots to previously assembled crowns, the adhesive tank may be removed from the machine, the heater turned off and the cork disc feeding mechanism made inoperative.

In this manner, the same machine may be used to serve the purpose of three machines to meet the production needs of a factory.

When the machine is to be used to assemble the crowns and to apply the center spots thereto by a continuing operation, a tank 19 having a vertically reciprocatory movement and carrying a distributing swab 20 is mounted closely adjacent the delivery disc 15. This tank 19 has a dropper mechanism 21. With each dwell of the rack 18, the tank 19 is moved downwardly, as indicated in dotted lines in Fig. 3, thus depositing a drop of adhesive in one shell and causing the spreader swab 20 to disperse previously delivered adhesive in the adjacent shell. This is an old and well known mechanism, long used in crown cap assembling machines. Ordinarily the adhesive used contains casein, an adhesive which sets as a result of the evaporation of the vehicle. To make this casein tacky prior to the depositing of a cushion disc within the shell, a heater 22 is provided, the sole function of which is to hasten the evaporation of the vehicle of the adhesive so as to have it tacky by the time it reaches the cork disc feeding mechanism shown at 23 in the drawings. This cork disc feeding mechanism may take any desired form, but, as shown, corresponds in the construction and arrangement of parts as well as in its mode of operation with the disclosure of the Clark patent.

The mechanisms desccribed correspond with the corresponding parts in the Clark patent, and have the same function and mode of operation, with the exception that in the Clark patent an adhesive carried by a paper collet is used instead of a fluid adhesive, so that a strip feeding and disc cutting mechanism is used in lieu of the tank 19 and its appurtenances.

If an albuminous adhesive be used, the heater 22 may be dispensed with and heat applied to the shells while in the collecting head or drum.

In adapting the machine for use in the production of spot crowns, we provide adjacent the collecting head or drum 16, a strip feeding and conditioning mechanism, and a spot cutting and applying mechanism. These mechanisms, when the machine is used in making a completely assembled center spot crown, are positioned between the cushion disc feeding mechanism 23 and the said collecting head or drum.

This strip feeding mechanism comprises a support 24 for a reel of strip material 25 having one face thereof, indicated at 26, coated with a dry adhesive. This adhesive preferably consists of casein and albumen and a plastic carrier consisting of latex. This latex is not a vulcanizable compound but preferably is a pure latex which undergoes no chemical change when subjected to heat.

Upon the side of the machine opposite to that where the spindle 24 is located, are a pair of feed rollers 27 and 28 carrying enmeshed gears 29 and 30, one of which as 30 carries a ratchet wheel 31. Mounted upon the shaft of the feed roller 28 is a rocking frame 32 carrying a pawl 33 co-operating with the ratchet wheel 31. This frame is oscillated with each cycle of operations of the machine by a rocking lever 34 acting upon a link 35 connected with said frame 32. Said lever 34 is actuated by an arm 36 and an eccentric 37 upon the main shaft 38 of the machine. This strip feeding mechanism has been used for many years prior to our invention in placing liners in screw caps.

With the construction described, the throw of the lever is such as to advance the strip 25 a distance slightly in excess of the diameter of the center spots to be cut therefrom, this advancement of the strip being by an intermittent movement affording a dwell in the movement of the strip during which the center spot is cut therefrom by a plunger die mechanism to be hereinafter described.

The cutting of the center spot occurs during the idle or return movement of the rocking frame 32 and while the pawl 33 is moving over the teeth of the ratchet wheel 31. The roller 27 is spring pressed toward the roller 28, and the feeding mechanism may be made inoperative, in the event of stoppage of the machine, by lifting said roller 27 out of engagement with the strip positioned between it and the roller 28.

As heretofore stated, the coating 26 of adhesive upon the strip 25 is dry and non-tacky. It will not become tacky or cannot be set by the application of heat thereto until sufficient moisture has been applied to the adhesive and absorbed thereby to make the casein constituent of the coating sufficiently tacky to cause the spot cut from the strip to adhere to the cushion disc within a metal shell, and to provide a sufficient supply of moisture to permit the coagulation of the albuminous constituent of the coating when subjected to heat at the requisite temperature, from 140° to 160° F.

The amount of moisture applied to the coating must be controlled or restricted to an extent to prevent the adhesive becoming slimy, since this condition will tend to foul the spot cutting die and might result in side slipping of the spot when the cutting die plunger forces the spot into contact with the cushion disc.

To apply moisture to the coating 26, we provide a dampening roller 39 having a central flat ridge 40 and narrow flat edge ridges 41 and 42 so as to apply the moisture in spaced stripes along the coating 26 upon the strip. These stripes are spaced apart to an extent to ensure the distribution of moisture throughout the coating, largely as a result of capillary action. The roller 39 is partially submerged in the dampening fluid contained in a tank 43.

Suitable guides 44 and 45 upon opposite sides of the roller 39 are provided to direct the run of the strip in a manner to bring it into operative engagement with the ridges 40, 41 and 42, and a weighted roller 46 is idly mounted in the tank 43 for the purpose of ensuring the desired intimate engagement of the coated surface of the strip with said dampening roller 39. The roller 46 is a free floating roller, and it, like the roller 39, is turned solely as a result of the travel of the strip 25 in relation thereto.

The application of the dampening fluid to the coated surface of the strip is indicated in Fig. 6, the stippled portion of this figure indicating parts of the coating which do not engage the ridges 40, 41 and 42. To expedite the diffusion of the moisture throughout the adhesive in the coating 26, we subject the strip in its passage from the roller 39 to the cutting die and the feed rollers, to a vapor which is preferably heated. The effect of the vapor is to accelerate the diffusion of the moisture applied by the roller 39, and to supply enough moisture to the entire surface of the coating 26 to ensure its becoming sufficiently tacky to cause a spot cut from the strip to adhere to the cushion disc of a crown cap during that short interval of contact resulting from the descent of a plunger associated with the cutting die.

In the drawings, the strip is subjected to the action of a vapor while passing through a housing 47 into which water vapor is discharged through an intake pipe 48, this housing having an exhaust pipe 49 at the end thereof opposite to the intake pipe 48. After leaving the housing 47, the strip 25 passes over a die plate 50 carrying a die plate 51 directly above the channel 12.

The cutting die, which is of an old and well known construction, is shown at 52 and embodies therein a plunger mechanism which, with the descent of the die, will force the spot cut from the strip 25 onto the cushion disc, and develop sufficient pressure to cause said spot to adhere to the cushion disc with sufficient tenacity to permit the subsequent feeding of the crown by the rack 18 to the point of delivery of the crown to the collecting head or drum without likelihood of displacement of the center spot.

The actuating mechanism for said plunger is the same as in the machine of the Clark patent as applied to the paper collet cutting mechanism of that patent. It includes a reciprocatory head 53 actuated by a link 54 acted upon by an eccentric carried by the shaft 38.

In actual practice, we have found that the arrangement of the dampening roller and of the vapor tank in the relation heretofore described gives highly satisfactory results in securing the desired impregnation of the coating 26 to ensure the initial sticking of the center spot to the cushion disc and the final setting of the adhesive or the albuminous portion thereof by subjecting the assembled crown, including the center spot, to a temperature sufficiently high to coagulate the albumen, and sufficiently low to prevent impairment of the elasticity or resilience of the material of the cushion disc, particularly the portion thereof exposed about the center spot.

The arrangement of these parts as shown and as herein described ensures the incorporation of sufficient moisture in the adhesive with sufficient rapidity to permit the operation of the machine at the desired high speeds, securing an output of approximately two hundred and fifty center spot crowns per minute.

It will be noted that the coating 26 is firmly adherent to the material of the strip 25 while it is in the reel of this material.

After the application of the center spot to the cushion disc and while the spot is adhered thereto, mainly by the casein and the latex in the adhesive, it is delivered to the rotatable collecting head or drum 16 in which each crown is subjected to a continuing pressure throughout the area of the center spot from a plunger maintained at a temperature sufficiently high to cause the setting of the albuminous constituent of the adhesive by the application of heat at the necessary temperature. The speed of rotation of the collecting drum is such as to bring each of the plungers into alinement with the opening 12 in the table of the machine in synchronism with the action of the feed rack 18.

In the form of the invention shown, the drum 16 is continuously actuated, advancing one stage with each operative cycle of the feed rack, each stage corresponding with that dwell during which a center spot is applied to some crown along the rack 18.

Adjacent the top of the sequence of spring pressed heated plungers is a cam 55 for raising these plungers, this cam being of a length to permit the delivery of a completed spot crown as it approaches the feed rack 18, and the descent of the plunger immediately following the delivery of a crown to the drum or during the succeeding impulse or feeding step of the crown.

At 56 we have shown conventionally the delivery chute of the machine.

Except as to the location of the cam 55 and the detailed construction of the various plungers, the construction of the collecting head or drum and its actuating mechanism is the same as in the Clark patent heretofore referred to.

The various plungers are all designated by the same reference numeral, 57, each plunger being a replica of every other and having the same mode of operation as controlled by the cam 55.

As distinguished from the structure of the Clark patent, the machine of the present invention employs heated plungers 57, so that during the final stage in the functioning of the machine the various crowns, throughout the area of the center spot, will be subjected to both heat and pressure as distinguished from the mere application of pressure in the Clark machine.

Each plunger comprises a stem 58 having an opening extending longitudinally therethrough, the bottom of which is closed by a tip or plate 59 of a material having high heat conductivity, copper having been used. The portion of the stem contacting with the tip or plate is of insulating material having low heat conductivity. The tip has a pocket therein, as shown at 60, and within this pocket is an electrical resistance heating element 61. Leading from this element are terminal wires 62 and 63 passing upwardly through the opening in the stem 58.

Toward the top of the stem is a bearing stud 64 having mounted thereon an anti-friction roller 65 adapted to co-operate with the cam 55 in raising and lowering the plunger.

The collecting head or drum is provided with a base plate 66 having an edge recess 67 therein for the reception of the crowns. Carried by this base plate is a ring 68 in which the lower ends of the various plungers 57 are mounted for vertical reciprocation, and also a ring bracket 69 having openings therethrough for the upper portions of the various plungers. Between the bracket 69 and the seat 70 is a spring 71 carried by the plunger and having a normal tendency to force the plunger downwardly with the tip 59 thereof in the desired pressure engaging relation to the center spot upon the cushion disc within the crown 72.

To facilitate the mounting and removal of the plungers in the collecting head or drum, the spring seat 70 takes the form of a key engaging a slot 73 in the stem 58, the removal of this key making the spring 71 inoperative in relation to the plunger, so that the plunger may be withdrawn from the bearings in the bracket 69 and the bearing plate 68.

The low temperatures required to set an albuminous adhesive permit the use of a low potential circuit for energizing the heating element 61, so that it is possible to connect the heating elements of all of the plungers 57 in series and to use an ordinary lighting circuit as the source of energy for heating the plungers.

It will be noted that the various plungers have a circular movement about the axis of the collecting head or drum, and also have a vertically reciprocatory movement during the rotation of the drum while the plungers respectively are adjacent the lifting cam 55. The method of electrically connecting the heating elements and the various plungers with each other and with the source requires an arrangement of parts permitting both the rotary and the vertical movements of the plungers.

The terminals 62 and 63 of any plunger are connected with the terminals 63 and 62 of the adjacent plunger, preferably a continuous conductor wire being used for the terminal 62 of the heating element of one plunger, and the terminal 63 of the heating element of the adjacent plunger, said connecting wire being looped and being of a length to permit the vertical movement of either plunger independently of the adjacent plunger.

As shown in Fig. 2 of the drawings, these looped conductor wires are positioned entirely about the periphery of the head, and, to avoid possible entanglement of adjacent conductor wires, we provide a ring 74 passing through all of the loops and so positioned in relation to each loop as to permit the necessary vertical movement of any plunger without any possibility of any displacement of the loops resulting in entanglement of adjacent loops. While this ring may be a floating ring, we prefer to support it by brackets 75 from the base of the collecting drum.

The hub 76 of the collecting head or drum carries an insulating block 77 provided with two collector rings 78 and 79, which rings are connected by leads 80 and 81 with the terminal wires 62 and 63 of the heating elements of two adjacent plungers 57.

Supported in any desired manner as by a bracket 82, is a fixed head 83 of insulating material carrying brushes 84 and 85 spring pressed into contact with the collector rings 78 and 79. One of the brushes as 85 is connected by a conductor 86 with a suitable source of electrical supply, and the other brush 84 is connected by a conductor 87 with the other side of the line of the electrical source. This arrangement permits the continuous application of electrical energy to the electrical resistance heating elements of the various plungers at all times while the drum is rotating, thus ensuring the development and maintenance of the desired temperature in the metallic tips 59 of the various plungers.

The faces of these tips contacting the center spot are so formed as to conform to the contour assumed by the cushion disc as a result of the shape of the top of the metal shell of the crown, thus ensuring the effective distribution of heat throughout the entire area of the center spot.

While the temperature required to set an albuminous adhesive within a given time interval may be accurately determined, the temperature to which the heating tip 59 and the various plungers must be brought, may vary during different seasons of the year. To permit a fairly accurate control of the temperatures developed by the electrical resistance heaters in the various plungers, we provide in one side of the line 86 and 87, a rheostat 88.

While we have found a series connection of the heating elements in the various plungers to give highly satisfactory results in the actual operation of a machine embodying the invention, said heating elements may, if desired, be connected in parallel.

One reason why it is preferable to connect the heating elements of the various plungers in series is that by placing an electrical signal lamp 89 in the circuit to the collector rings 78 and 79, a failure of any heating element will be indicated immediately to the operator, so that the machine may be stopped without unnecessary wastage. If parallel wiring is resorted to, the heating element in any plunger might go dead, and thus make this plunger inoperative to cause a proper bonding of the center spot to the cushion disc, since upon inspection, an improper setting of the adhesive might not be detected upon the delivery of the crown. Such imperfect crowns might escape detection until after delivery to the user, thus causing the rejection of a large quantity of crowns because of the separation of an occasional center spot from the cushion disc. With a series connection, however, the failure of any heating element will be instantly indicated, so that the machine may be stopped and tests made to locate the fault. A continued application of heat and pressure will not injure any crown, particularly when there is a gradual diminution of the heat due to the interruption of the circuit to all of the heating elements in the event of failure of one of these elements, or the breakage of the line, at any point.

A machine embodying the invention may be operated to produce ordinary crowns having no center spot. While so operating, the facing strip feed mechanism and the cutting die and plunger may be removed from the machine or made inoperative, and the various plungers 57 may be heated or not according to the adhesive used in securing the cushion discs in the metal shells.

It may also be used to merely apply center spots to pre-assembled crowns, or those in which the cushion disc has already been cemented to the metal shell. When so used, the tank 19 and its appurtenances and the cork disc feeding mechanism 23 may be removed or disconnected from the mechanisms actuating same, so as to be inoperative. This operation may be desirable because with other crown assembling machines, the output per minute may be five hundred or more, while in the machine of the present application the output capacity is only in the neighborhood of two hundred and fifty per minute.

The machine may be, and generally is used to both assemble the cushion disc in the metal shell and apply the center spots to such cushion discs by a continuing operation. This mode of operation is desirable in that one handling of the metal shells is avoided, and likelihood of mutilation of the decorations upon the shell is reduced to a minimum.

The operation of the machine will be described in connection with the continuous operation method immediately above referred to.

In the accompanying drawings, the various actuating mechanisms, which are old and well known, are not illustrated in detail. Those used correspond with the showing of the Clark patent, although the design of the machine as a whole is subject to wide variation.

A succession of metal shells is brought by the delivery mechanism 15 into a position where they may be engaged by the feed rack 18, which, as heretofore stated, has a four way motion so as to intermittently advance the shells to bring each of them successively in the operative relation to the adhesive applying tank 19 and its swab 20, the cork feed mechanism 23 and the center spot cutting and applying mechanism, as shown in Fig. 4. Upon the conclusion of each cycle of the rack 18, one shell is positioned beneath the spout 21 of the tank 19; another shell beneath the spreader or swab 20; another shell below the delivery of the cork feed mechanism, and another shell below the cutting die and plunger 52.

When shells are so positioned, all of them are at rest and each of the aforesaid mechanisms operates substantially simultaneously with the operation of the others.

The operation of the adhesive applying and spreading and the cork feed mechanisms is old and well known in this art. The mechanism for cutting and applying the center spots to the cushion discs in the metal shells varies from the old and well known type of machine and is essential to produce a machine capable of producing center spot crowns in accordance with the invention.

While the rack 18 is operative to advance the shells along the slot 12 in the top plate of the machine, the rollers 27 and 28 are actuated to feed the strip 25, this feeding movement, which is intermittent, being slightly greater than the diameter of the spots to be cut from the strip.

The adhesive on the strip while in the reel 24 is non-tacky, the casein and albumen constituent therein being hard and dry and the latex carrier therefor soft and plastic. With the turning of the feed rollers 27 and 28, the strip is drawn across and in contact with the dampening roller 39, the raised ridges 40, 41 and 42 only contacting with the coating of adhesive 26 of said strip. The guides 44 and 45 which are fixed pins, restrict the line of movement of the strip so as to ensure its engaging said ridges, and the weighted roller 46 develops sufficient pressure to ensure the web picking up the maximum amount of moisture from these ribs. With this arrangement, the dampening liquid is applied at spaced intervals laterally of the strip, as indicated in the unstippled portions thereof, as shown in Fig. 6. The housing or vapor box 47 is so positioned in relation to the dampening roller as to afford a short time interval between the application of the dampening fluid to the adhesive and the cutting of center spot strips therefrom. This interval allows the moisture to penetrate the thin coating of adhesive, which is approximately .001 in thickness, and the application of the vapor will not only have a tendency to make the casein in the adhesive and the latex slightly tacky, but will accelerate the absorption of moisture by the entire adhesive coating.

With the use of a dampening roller as shown and described and a vapor box or other means for applying vapor to the coating of adhesive, the amount of said dampening liquid applied may be controlled, and the adhesive will, as it is brought into operative relation to the cutting die and plunger 52, be sufficiently tacky to adhere with sufficient firmness to the cushion disc in a metal shell to avoid that displacement of the disc known as side slipping causing the disc to be off-center in relation to the cushion disc. If excess moisture be applied to the coating of adhesive upon the strip, the adhesive will become slimy instead of tacky, so that side slipping will occur often enough to cause the production of a high percentage of imperfect crowns.

While the adhesive upon the portion of the strip acted upon by the die and plunger mechanism 52 will be sufficiently tacky to cause it to adhere to the cushion disc when pressed thereon, it is not sufficiently tacky to cause fouling of the cutting die even after a protracted run of the machine.

We consider that the interval elapsed between the application of the dampening liquid to the coating of adhesive and the application of a center spot cut from the strip to the cushion disc is of great importance to the successful operation of the machine, because during this interval the dampening liquid has an opportunity to penetrate the material of the adhesive and to be thoroughly diffused throughout same, so that within the body of the adhesive there will be sufficient of this liquid to supply that necessary for the subsequent coagulation of the albumen when it is subjected to heat in the collecting head or drum.

The amount of vapor condensate upon the coating of adhesive is not sufficiently great to ensure a proper coagulation of the albuminous constituent of the adhesive, but is sufficiently great to ensure the entire surface of the coating being moist enough to ensure a proper initial bonding of the center spot to the cushion disc when it is applied thereto by the die and plunger mechanism 52.

In its travel between the spot applying mechanism and the collecting head or drum, the crown receives six or seven impulses, the exact number of which is immaterial, so that further time is allowed for the absorption of the dampening liquid amounting to between one and two seconds.

Immediately that a crown is delivered to the collecting head or drum 16, it is subjected to heat and pressure by a plunger 57 since the roller 65 passes out of engagement with the cam 55 immediately following the delivery of a crown below a plunger. The spring 71 maintains this pressure until the roller 65, carried by the plunger, engages the opposite end of said cam and is raised, thus allowing a time interval of from seven to ten seconds during which the coating of adhesive upon the center spot is subjected to an elevated temperature throughout the surface thereof. This temperature is applied throughout the area of the center spot, and the temperature of the metallic tip 59 of the plunger is brought to and maintained at a temperature which will ensure the adhesive being brought to the coagulating temperature of albumen during the short interval that the crown is in the collecting head or drum.

While the actual temperature required in the adhesive will not exceed 160° F., the temperature of the portion of the plunger engaging the center spot may have to be considerably in excess of this temperature in order to bring the adhesive to the desired temperature within the time interval allowed by the rotation of the head or drum.

During each complete rotation of the head or drum, each plunger carried thereby, in addition to its movement with the drum, has a vertically reciprocatory movement while adjacent the cam 55. To permit this vertical adjustment, slack has to be provided in the electrical connections leading to each plunger and connecting it with the adjacent plunger when a series wiring is resorted to, and with the collector rings, the use of which is made necessary by the rotation of the drum.

The advantage of connecting the various plungers in series has already been pointed out. Not only will the failure of the electrical resistance heater of any plunger be immediately indicated by the lamp 89, but any interruption of the circuit from the source will also be so indicated. Furthermore, a series connection of the various electrical resistance heating elements ensures a sufficiently uniform heat in all of the plungers to cause uniformity in the product.

The ring 74, passing through the looped connection between adjacent plungers permits the raising and lowering of each plunger without possibility of disarranging the electrical connections.

The ejector mechanism, not shown in the drawings, is the same as in the Clark machine above referred to.

By the machine of the invention, the use of excessively high temperatures is avoided, and the heat necessary to set the coating of adhesive is limited to the area of the plunger tip 59 contacting with the material of the center spot. Ordinarily, the top of a metal shell is dished outwardly slightly and the outer face of the metal tips 59 is correspondingly cupped, so that the initial contact of each plunger with the center spot occurs centrally of said spot. This has a tendency to avoid any displacement of the center spot upon the sudden application of pressure thereto by the plunger.

By insulating the metal tip from the plunger by a material having low heat conductivity, the heat is concentrated in the metal tip 59 carried by each plunger. This prevents overheating of the plunger springs, avoids likelihood of short circuiting of the electrical resistance heater within the plunger, permits rapid repairs when necessary and avoids wastage of electrical energy.

By providing a rheostat in the line to the head 83 carrying the brushes 84 and 85, the current supplied to the various plungers may be controlled with a degree of nicety ensuring the proper development of heat in each plunger and variation therein according to different temperature conditions occurring in different seasons of the year.

With a machine embodying the invention, year round production with substantial uniformity in the product can be secured.

If it be desired to use the machine for applying center spots to previously assembled crowns, the tank 19 may be removed from the machine and the cork feeding mechanism be made inoperative by disconnecting the feed slide from its source of power. If it be desired to use the machine for merely assembling crowns without center spots and without the use of heat in the collecting head or drum, the actuating mechanism for the plunger die 52 may be disconnected, the strip of material 25 removed from the machine and the circuit to the heating elements and the various plungers disconnected.

While, as heretofore stated, the invention is shown and described in connection with a machine of the general type shown in the Clark patent, its use is not limited to this particular type of machine, and it is not our intention to limit the invention to the details of the various mechanisms as shown in the drawings, it being obvious that such may be varied without departing from the spirit and scope of the invention.

Having described the invention, what we claim as new and desire to have protected by Letters Patent, is:—

1. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, means whereby crowns are fed toward and delivered to said drum, means for rotating said collecting head or drum and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

2. A crown cap spotting machine embodying therein a rotatably mounted collecting head or drum having a plurality of peripheral or edge recesses adapted to receive a crown, a spring pressed plunger in vertical alinement with each recess, each plunger comprising a stem having an opening extending longitudinally therethrough, a metal tip having high heat conductivity closing the bottom of said plunger, the portion of said stem contacting with said tip being of material having low heat conductivity, an electrical resistance heating element carried by said tip, means for successively raising and lowering said plungers, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

3. A crown cap spotting machine embodying therein a rotatably mounted collecting head or drum having a plurality of peripheral or edge recesses adapted to receive a crown, a spring pressed plunger in vertical alinement with each recess, each plunger comprising a stem having an opening extending longitudinally therethrough, a metal tip having high heat conductivity closing the bottom of said plunger, the portion of said stem contacting with said tip being of material having low heat conductivity, an electrical resistance heating element carried by said tip, the downwardly presented face of said tip being cut to conform to the dish of the metal shell of a crown, means for successively raising and lowering said plungers, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

4. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, said heating elements being connected in series, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

5. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, said heating elements being connected in series, means whereby the potential impressed upon said elements may be varied, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

6. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, said heating elements being connected in series, a signal lamp arranged in circuit with said elements, whereby the failure of any element will be indicated by said lamp, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

7. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, said heating elements being connected in series, means whereby the potential impressed upon said elements may be varied, a signal lamp arranged in circuit with said elements, whereby the failure of any element will be indicated by said lamp, means whereby crowns are fed toward and delivered to said drum, means for rotating said collecting head or drum and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

8. A crown cap spotting machine embodying therein a rotatably mounted collecting head or drum having a plurality of peripheral or edge recesses adapted to receive a crown, a spring pressed plunger in vertical alinement with each recess crown, means for successively raising and lowering said plungers, an electrical resistance heating element in each plunger, flexible looped electrical conductors connecting a terminal of one of said elements to the opposite terminal of the adjacent element, a fixed head of insulating material carrying brushes, electrical conductors extending from said brushes respectively to a source, a hub of insulating material rotatable with said drum and having collector rings co-operating with said brushes, conductors extending from said collector rings to opposite terminals of two adjacent plungers, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

9. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, flexible looped electrical conductors connecting a terminal of one of said elements to the opposite terminal of the adjacent element, a fixed head of insulating material carrying brushes, electrical conductors extending from said brushes respectively to a source, a hub of insulating material rotatable with said drum and having collector rings co-operating with said brushes, conductors extending from said collector rings to opposite terminals of two adjacent plungers, a ring passing through the loops of the various connector wires permitting movement of said plungers without entanglement of said connector wires, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

10. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, a tank for dampening fluid located between said reel support and said die, a dampening roller in said tank, and a source of vapor between said tank and said plunger die, whereby the coating upon said strip will successively have moisture applied thereto by said roller and vapor applied thereto from said source.

11. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, means whereby crowns are fed toward and delivered to said drum, means for rotating said collecting head or drum and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, a tank for dampening fluid located between said reel support and said die, and a dampening roller having a plurality of flat ridges about same whereby the moisture is applied in spaced stripes to said coating.

12. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, a tank for dampening fluid located between said reel support and said die, a dampening roller having a plurality of flat ridges about same whereby the moisture is applied in spaced stripes to said coating, and a source of vapor between said tank and said plunger die whereby the coating upon said strip will successively have moisture applied thereto by said roller and vapor applied thereto from said source.

13. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, a tank for dampening fluid located between said reel support and said die, a dampening roller having a plurality of flat ridges about same whereby the moisture is applied in spaced stripes to said coating, and guide bars upon opposite sides of said roller directing the run of the strip in a manner to engage it with said ridges.

14. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, a tank for dampening fluid located between said reel support and said die, a dampening roller having a plurality of flat ridges about same whereby the moisture is applied in spaced stripes to said coating, guide bars upon opposite sides of said roller directing the run of the strip in a manner to engage it with said ridges, and a weighted roller mounted in said tank and pressing said strip into engagement with the ridges upon said dampening roller.

15. A crown cap spotting machine embodying therein a rotatably mounted collecting head or drum having a plurality of peripheral or edge recesses adapted to receive a crown, a spring pressed plunger in vertical alinement with each recess, means for successively raising and lowering said plungers, an electrical resistance heating element in each plunger, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, a tank for dampening fluid located between said reel support and said die, a dampening roller in said tank, and a housing having an intake pipe discharging vapor thereinto and an exhaust pipe leading from the opposite end thereof, said housing being arranged between said tank and said plunger die, whereby the coating upon said strip will successively have moisture applied thereto by said roller and vapor applied thereto while in said housing.

16. A crown cap spotting machine embodying therein longitudinally extending guides for the metal shells of crown caps, means intermittently advancing said metal shells along said guides, a shell feeding mechanism adjacent one end of said guides, an adhesive applying and spreading mechanism above said guides adjacent said feeding mechanism, a cork disc feeding mechanism beyond said adhesive applying mechanism in the direction of movement of said shells, a rotatably mounted collecting head or drum adjacent the other end of said guides, said drum having a plurality of peripheral or edge recesses adapted to receive a crown, a spring pressed plunger in vertical alinement with each recess, means for successively raising and lowering said plungers, an electrical resistance heating element in each plunger, means whereby crowns are fed toward and delivered to said drum, means for rotating said collecting head or drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, and means located between said reel support and said die for applying moisture to said coating.

17. A crown cap spotting machine embodying therein longitudinally extending guides for the metal shells of crown caps, means intermittently advancing said metal shells along said guides, a shell feeding mechanism adjacent one end of said guides, an adhesive applying and spreading mechanism above said guides adjacent said feeding mechanism, a cork disc feeding mechanism beyond said adhesive applying mechanism in the direction of movement of said shells, a rotatably mounted collecting head or drum adjacent the other end of said guides, said drum having a peripheral or edge recess adapted to receive a crown, a spring pressed plunger in vertical alinement with each crown, means for successively raising and lowering said plungers, an electrical resistance heating element in each plunger, means whereby crowns are fed toward and delivered to said drum, and means adjacent said drum for applying center spots to the cushion disc of a crown including therein an intermittently operative strip feeding mechanism, a die positioned above the path of movement of the crowns, an intermittently operative plunger die co-operating therewith, a support for a reel of strip material having on one surface thereof an adhesive coating, a tank for dampening fluid located between said reel support and said die, a dampening roller having a plurality of flat ridges about same whereby the moisture is applied in spaced stripes to said coating, and a source of vapor between said tank and said plunger die whereby the coating upon said strip will successively have moisture applied thereto by said roller and vapor applied thereto from said source.

JAY BERNARD EISEN.
CHARLES H. RASMUSSEN.